United States Patent
Song et al.

(10) Patent No.: US 9,247,437 B2
(45) Date of Patent: Jan. 26, 2016

(54) QUICK POSITIONING METHOD AND DEVICE FOR MULTIPLE CYCLES AND MULTIPLE USERS

(75) Inventors: Na Song, Shenzhen (CN); Jun Li, Shenzhen (CN); Qing Duan, Shenzhen (CN); Jian Wang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 526 days.

(21) Appl. No.: 13/704,553

(22) PCT Filed: Nov. 18, 2010

(86) PCT No.: PCT/CN2010/078849
§ 371 (c)(1),
(2), (4) Date: Dec. 14, 2012

(87) PCT Pub. No.: WO2011/160388
PCT Pub. Date: Dec. 29, 2011

(65) Prior Publication Data
US 2013/0095876 A1  Apr. 18, 2013

(30) Foreign Application Priority Data

Jun. 24, 2010  (CN) .......................... 2010 1 0208209

(51) Int. Cl.
*H04W 24/02* (2009.01)
*H04W 48/08* (2009.01)

(52) U.S. Cl.
CPC .............. *H04W 24/02* (2013.01); *H04W 48/08* (2013.01)

(58) Field of Classification Search
None
See application file for complete search history.

(56) References Cited

U.S. PATENT DOCUMENTS

2010/0041390 A1  2/2010  Chen et al.

2013/0322361 A1* 12/2013 Ko et al. ...................... 370/329

FOREIGN PATENT DOCUMENTS

| CN | 1929484 A | 3/2007 |
|---|---|---|
| CN | 101340697 A | 1/2009 |
| CN | 101640905 A | 2/2010 |
| CN | 102948176 A | 2/2013 |
| CN | 102300165 B | 8/2014 |
| JP | 201068130 A | 3/2010 |
| WO | 2005107311 A1 | 11/2005 |
| WO | 2010028279 A1 | 3/2010 |

OTHER PUBLICATIONS

International Search Report in international application number: PCT/CN2010/078849 , mailed on Mar. 17, 2011.
English Translation of the Written Opinion of the International Search Authority in international application No. PCT/CN2010/078849, mailed on Mar. 17, 2011.
Comparison of Some Index Techniques Aug. 31, 2009.

* cited by examiner

*Primary Examiner* — Philip Sobutka
(74) *Attorney, Agent, or Firm* — Oppedahl Patent Law Firm LLC

(57) ABSTRACT

The disclosure provides a quick positioning method and device for multiple cycles and multiple users, and the method includes: a processing index is created for each attribute of a user in a base station, wherein same attributes with the same transmission cycles and the same transmission offsets share one processing index; when a user accesses the base station, the user is mounted into a corresponding processing index according to an attribute of the user, a transmission cycle of the attribute, and a transmission offset of the attribute; and by inquiring a processing index corresponding to the current time point, the base station demodulates the attribute of the user mounted in said processing index. With the disclosure, a target can be hit promptly, processing time is saved, processing efficiency is improved, and the processing time delay of the whole link is reduced.

16 Claims, 3 Drawing Sheets

Fig. 1

| users | attributes of each user | | | |
|---|---|---|---|---|
| users A | A1 | A2 | ... | An |
| users B | B1 | B2 | ... | Bn |
| users C | C1 | A2 | | |
| ... | | | | |
| users N | N1 | B2 | | |

Fig. 2

| attributes | cycles and offsets of each attribute | | |
|---|---|---|---|
| A1 | 5ms<br>0, 1, 2, 3, 4 | 10ms<br>0, 1, 2, 3, 4, 5, 6, 7, 8, 9 | ... |
| A2 | 2ms<br>0, 1 | 10ms<br>0, 1, 2, 3, 4, 5, 6, 7, 8, 9 | ... |
| B1 | ... | | |

QUICK POSITIONING METHOD AND DEVICE FOR MULTIPLE CYCLES AND MULTIPLE USERS

TECHNICAL FIELD

The disclosure relates to the technical field of multi-user management in mobile communications, in particular to a quick positioning method and device for multiple cycles and multiple users.

BACKGROUND

Along with the development of urbanization, urban population becomes increasingly denser, which presents a challenge for a Long Term Evolution (LTE) system in mobile communications and requires a base station that can accommodate more users. Among those users, there are different attributes for each kind of users, as shown in FIG. 1, assuming that there are users A, B, C, . . . , N at present, wherein user A has attributes A1, A2, . . . , An; user B has attributes B1, B2, . . . , Bn; user C has attributes C1, A2; and user N has attributes N1, B2; wherein each attribute also has different transmission cycles, and there are different transmission offsets under each transmission cycle. As shown in FIG. 2, transmission cycles of attribute A1 include: 2 ms, 5 ms, 10 ms, 20 ms, 40 ms, 80 ms, 160 ms, etc., and there are five transmission offsets 0, 1, 2, 3, 4 under the transmission cycle 5 ms.

Although there may be different attributes for a certain user, the cycles and offsets under a certain attribute is fixed. For example, for user A, the transmission cycle of attribute A1 is 5 ms and the transmission offset is 2, and the transmission cycle of attribute A2 is 10 ms and the transmission offset is 3. At a certain time point when user A reaches the processing time point of attribute A2 with transmission cycle of 5 ms and transmission offset of 2, and user B reaches the processing time point of attribute B1 with transmission cycle of 10 ms and transmission offset of 2, user A transmits the attribute A2 and user B transmits the attribute B1 to a base station for demodulation. It is therefore vitally important to manage these users and to promptly find out the user attributes in need of processing at each time point and transmit them to a base station.

However, there is no description for relevant techniques on how to perform management in the case of multiple cycles and multiple users, and if no management is performed on users, the process of finding at a certain time point the users in need of processing at the time point and finding out the attributes thereof for demodulation is extremely complicated, and has the following two disadvantages:

firstly, the time spent is rather long, which severely impacts the speed of analyzing a user attribute by a base station; as each user may have different attributes, only by inquiring at each time point about all attributes of all users, can it be determined which user reaches a processing time point and what kind of processing should be done;

secondly, a large amount of processing resources is occupied; a processor is being occupied during the whole process of inquiry, making it impossible to execute other operations.

SUMMARY

The technical problem to be solved in the disclosure is to provide a method and a quick positioning device for multiple cycles and multiple users, such that a base station can promptly find out and demodulate the attributes of the users that require processing at each time point.

The technical solution adopted by the disclosure is a quick positioning method for multiple cycles and multiple users, including:

creating, in a base station, a processing index for each attribute of a user, wherein same attributes with same transmission cycles and same transmission offsets share one processing index;

mounting a user into a corresponding processing index according to an attribute of the user, a transmission cycle of the attribute, and a transmission offset of the attribute when the user accesses the base station; and inquiring about a processing index corresponding to current time point, and demodulating, by the base station, the attribute of the user mounted in said processing index.

Wherein the mounting a user into a corresponding processing index according to an attribute of the user, a transmission cycle of the attribute, and a transmission offset of the attribute may include:

determining whether there exists a corresponding processing index according to an attribute of the user, a transmission cycle of the attribute, and a transmission offset of the attribute; if there exists a corresponding processing index, mounting the user into the existing processing index; otherwise, creating a new processing index for the attribute of the user, mounting the user into the newly created processing index, and saving the attribute of the user into a memory.

Wherein the method of creating a processing index may include:

setting the processing index Ue_Offset=Offset % P+P_Offset, wherein P is a transmission cycle of a certain attribute, Offset is a transmission offset of the user under the transmission cycle, P_Offset is a memory address offset of the transmission cycle of the certain attribute.

Wherein the method may further include: assuming that specific numerical values of the transmission cycle P of the certain attribute comprise: P1, P2, . . . , Pn, then a memory address offset of a transmission cycle Pn of the certain attribute is: Pn_Offset =P1+P2+ . . . +P(n−1).

Wherein the inquiring about, by the base station, a processing index corresponding to current time point, and demodulating, by the base station, the attribute of the user mounted in said processing index may include:

calculating a target index Idx=Sfn % P+P_Offset of a certain attribute at current time point, wherein Sfn is the current time point, P is a transmission cycle of the certain attribute, P_Offset is a memory address offset of the transmission cycle of the certain attribute; and determining a mounted user when the processing index equals the target index, and demodulating, by the base station, an attribute that the user has which corresponds to the target index.

The disclosure further provides a quick positioning device for multiple cycles and multiple users, including:

a processing index creating module configured to create, in a base station, a processing index for each attribute of a user, wherein same attributes with same transmission cycles and same transmission offsets share one processing index;

a processing index mounting module configured to, when a user accesses the base station, mount the user into a corresponding processing index according to an attribute of the user, a transmission cycle of the attribute, and a transmission offset of the attribute; and a user attribute demodulating and inquiring module configured to inquire about a processing index corresponding to current time point and demodulate the attribute of the user mounted in said processing index.

Wherein the processing index mounting module may be further configured to determine whether there exists a corresponding processing index according to an attribute of the user, a transmission cycle of the attribute, and a transmission offset of the attribute; if there exists a corresponding processing index, mount the user into the existing processing index; otherwise, create a new processing index for the attribute of the user, mount the user into the newly created processing index, and save the attribute of the user into a memory.

The processing index may be Ue_Offset =Offset % P+P_Offset, wherein P is a transmission cycle of a certain attribute, Offset is a transmission offset of the user under the transmission cycle, P_Offset is a memory address offset of the transmission cycle of the certain attribute.

Assuming that specific numerical values of the transmission cycle P of the certain attribute include: P1, P2, . . . , Pn, then a memory address offset of a transmission cycle Pn of the certain attribute may be Pn_Offset=P1+P2+ . . . +P(n−1).

Wherein the user attribute demodulating and inquiring module may be further configured to calculate a target index Idx=Sfn % P+P_Offset of a certain attribute at current time point, wherein Sfn is the current time point, P is a transmission cycle of the certain attribute, P_Offset is a memory address offset of the transmission cycle of the certain attribute; and determine a mounted user when the processing index equals the target index, and demodulate an attribute that the user has which corresponds to the target index.

With the aforementioned technical solution, the disclosure has at least the following advantages:

in the method and the quick positioning device for multiple cycles and multiple users according to the present disclosure, a processing index is created in a base station for each attribute of a user, wherein the same attributes with the same transmission cycles and the same transmission offsets share one processing index; whenever a user accesses the base station, the user is mounted in a corresponding processing index according to an attribute of the user, a transmission cycle of the attribute, and a transmission offset of the attribute, so that the base station can promptly find out and demodulate the attribute of the user mounted under the processing index by inquiring about the processing index corresponding to the current time point. The key of the disclosure lies in classifying different attributes of a user, creating a corresponding relationship among a transmission cycle, a transmission offset and a processing index, and meanwhile creating a corresponding relationship between time and a processing index, namely, creating the corresponding relationship between a transmission time point and a user attribute to be transmitted. With the technical solution of the disclosure, a target can be hit promptly, the processing time is saved, the processing efficiency is improved, and the processing time delay of the whole link is reduced.

BRIEF DESCRIPTION OF THE DRAWINGS

FIG. 1 is a schematic diagram of users and their attributes in an LTE system;

FIG. 2 is a schematic diagram of transmission cycles and transmission offsets of attributes in an LTE system;

DETAILED DESCRIPTION

Figure 3:
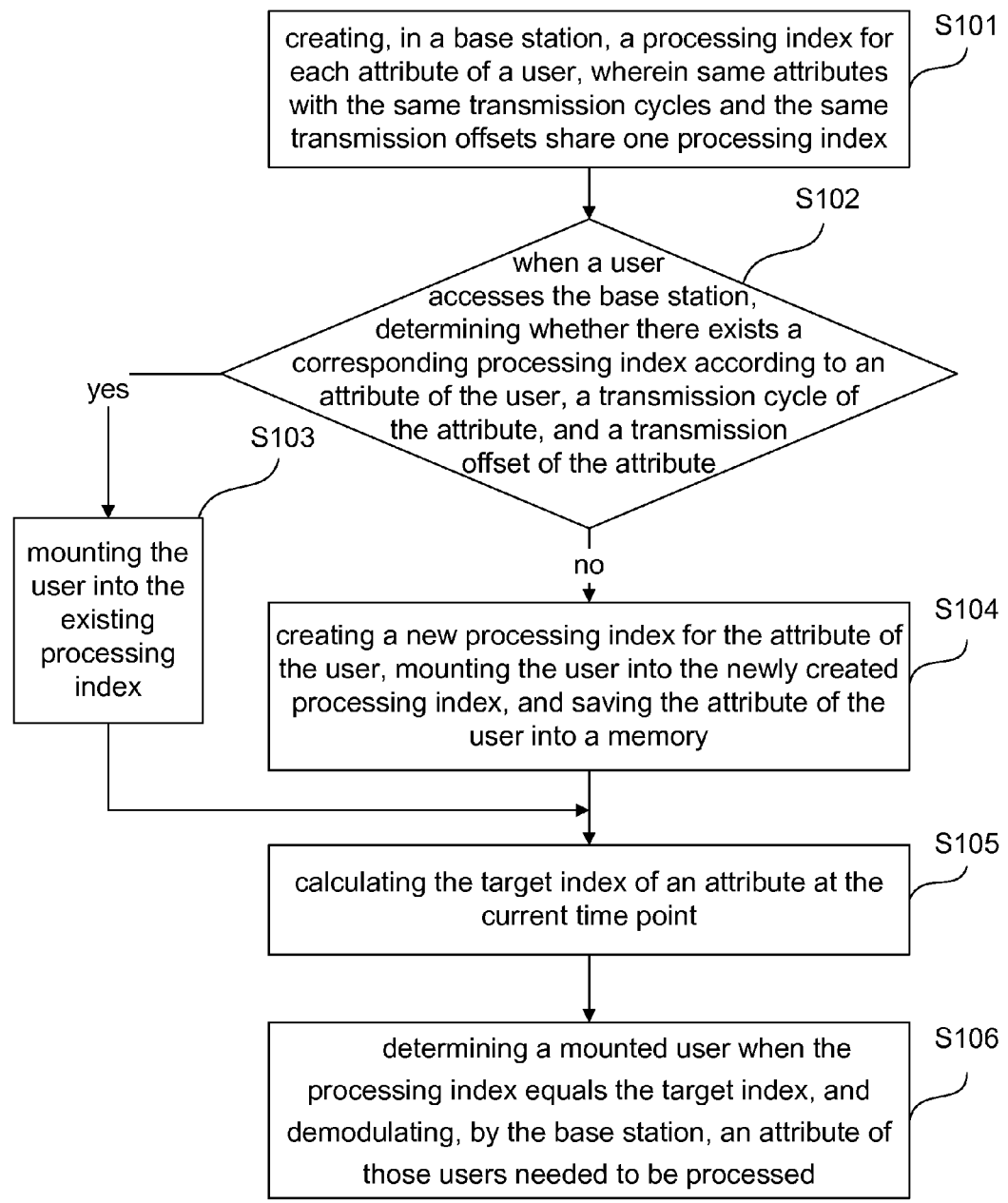
FIG. 3 is a flowchart of a quick positioning method for multiple cycles and multiple users according to a first embodiment of the disclosure.

In order to further illustrate the technical means adopted by the disclosure to achieve the expected objective and effect, the method and quick positioning device for multiple cycles and multiple users provided by the disclosure are elaborated as follows with reference to both the figures and preferred embodiments.

The first embodiment of the disclosure takes a user in an LTE system as an example, wherein the user has two attributes: scheduling request (SR) and channel quality indicator (CQI), namely, a base station is required to demodulate cyclically the SR and the CQI. Information of all cycles of both attributes SR and CQI is saved in the base station, for example, a section of space is reserved for the SR attribute in the memory, wherein the transmission cycles of the attribute SR of a user accessing the base station are 5 ms and 10 ms.

There are five SR attribute contents corresponding to transmission offsets 0, 1, 2, 3, 4 under the transmission cycle 5 ms, and there are ten SR attribute contents corresponding to transmission offsets 0~9 under he transmission cycle 10 ms. while the user accesses the base station, attribute contents of all cycles of the attribute SR are stored sequentially in the memory space, wherein the memory address offset of the transmission cycle 5 ms is 0, and the memory address offset of the transmission cycle 10 ms is 5; to summarize, assuming specific numerical values of the transmission cycle P of a certain attribute include P1, P2, . . . , Pn, the memory address offset of the transmission cycle Pn of the certain attribute preferably is Pn_Offset=P1+P2+ . . . +P (n−1), which relatively saves the memory space, and is also possible to leave a certain memory space in between when each transmission cycle of a certain attribute is stored. A location for the memory space is reserved in the memory before a user corresponding to a certain transmission cycle and transmission offset accesses the base station; a user attribute is saved in the reserved memory space location when a user corresponding to a certain transmission cycle and transmission offset accesses the base station.

For a certain user, an LIE system configures a fixed transmission cycle and transmission offset for attributes of the user when the user is created, for example, for the attribute SR of the user, its transmission cycle is 5 ms and its transmission offset is 2, which means that the base station should demodulate the attribute SR of the user at time points 2 ms, 7 ms, 12 ms, . . . For the attribute CQI, its transmission cycle is 10 ms and its transmission offset is 4, which means that the base station should demodulate the attribute CQI of the user at time points 4 ms, 14 ms, 24 ms, . . . . Thus, processing the user includes the following steps.

As shown in FIG. 3, the quick positioning method for multiple cycles and multiple users, includes the following steps:

Step 101 in a base station, a processing index is created for each attribute of a user, wherein same attributes with the same transmission cycles and the same transmission offsets share one processing index;

Step S102 when a user accesses the base station, it is determined whether there exists a corresponding processing index according to an attribute of the user, a transmission cycle of the attribute, and a transmission offset of the attribute; if there exists a corresponding processing index, Step S103 is executed, otherwise, Step S104 is executed;

Step S103 the user is mounted into the existing processing index and Step S105 is executed;

Step S104 a new processing index is created for the attribute of the user, the user is mounted into the newly created processing index, the attribute of the user is saved into a memory, and then Step S105 is executed;

it should be noted that in Steps S101 and S104, the processing index is Ue_Offset=Offset % P+P_Offset, wherein P is the transmission cycle of a certain attribute, Offset is the transmission offset of the user under the transmission cycle and is determined when the user is created, P_Offset is the memory address offset of the transmission cycle of the attribute. The Offset can reflect the transmission time point of a certain attribute of the user, therefore this formula for calculating the processing index can clearly express the relationship between the processing index and the transmission time point of a certain attribute of the user;

for the user with both attributes SR and CQI in this embodiment:

a processing index Ue_Offset=2% 5+0=2 is generated based on attribute SR: P=5 ms, P_Offset=0,Offset=2;

a processing index Ue_Offset=4% 10+5=9 is generated based on attribute CQI: P=10 ms, P_Offset=5, Offset=4;

Step S105 a target index Idx=Sfn % P+P_Offset of a certain attribute at the current time point is calculated, wherein Sfn is the current time point, P is the transmission cycle of the certain attribute, P_Offset is the memory address offset of the transmission cycle of the certain attribute.

Assuming the current time is sub frame No. 1 of the $5^{th}$ frame, then the time point corresponding to the current time is Sfn=sub frame number+10×frame number=1+10×5=51 ms, a target index Idx corresponding to attribute SR at the current time point includes:

Idx=Sfn% $P$+$P$_Offset=51% 5+0=1,

Idx=Sfn% $P$+$P$_Offset=51% 10+5=6;

likewise, a target index Idx corresponding to attribute CQI at the current time point can be determined;

and Step S106 a mounted user under the processing index Ue_offset is determined when the processing index Ue_offset equals the target index Idx, and the base station demodulates an attribute of the user needed to be processed;

specifically, it can be determined that users needed to be processed at the current time point are those mounted under processing indices 1, 6 according to the target index Idx corresponding to the attribute SR at the current time point, and the contents of attributes SR of these users are demodulated by the base station. Likewise, it can be determined that users needed to be processed at the current time point are those mounted under the target index Idx according to the target index Idx corresponding to the attribute CQI at the current time point, and the contents of attributes CQI of these users are demodulated by the base station.

It can be determined whether it is necessary to process the attribute SR of a user at the current time point by checking the calculated target index of the attribute SR at this time point in Step S105; if the user is not mounted under those target indices, then the user needs no processing at the time point.

Figure 4:
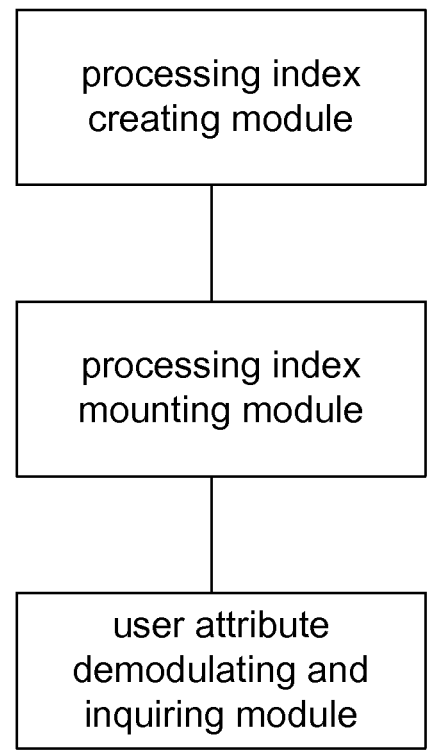
FIG. 4 is a schematic diagram of the composition of a quick positioning device for multiple cycles and multiple users according to a second embodiment of the disclosure.

As shown in FIG. 4, the second embodiment of the disclosure includes a quick positioning device for multiple cycles and multiple users. The device includes the following components:

1) a processing index creating module is configured to create, in a base station, a processing index for each attribute of a user, wherein same attributes with the same transmission cycles and the same transmission offsets share one processing index; and the method of creating a processing index is:

the processing index is Ue_Offset=Offset % P+P_Offset, wherein P is the transmission cycle of an attribute, Offset is the transmission offset of the user under the transmission cycle, P_Offset is the memory address offset of the transmission cycle of the attribute;

assuming specific numerical values of the transmission cycle P of a certain attribute include P1, P2, . . . , Pn, preferably, the memory address offset of the transmission cycle Pn of the certain attribute is Pn_Offset=P1+P2+ . . . +P(n−1), which relatively saves the memory space, and is also possible to leave a certain memory space in between when each transmission cycle of the certain attribute is stored;

2) a processing index mounting module is configured to, when a user accesses the base station, mount the user into a corresponding processing index according to an attribute of the user, a transmission cycle of the attribute, and a transmission offset of the attribute; specifically, the processing index mounting module determines whether there exists a corresponding processing index according to an attribute of the user, a transmission cycle of the attribute, and a transmission offset of the attribute, mounts the user into the existing processing index if there does exist a corresponding processing index, otherwise, creates a new processing index for the attribute of the user, mounts the user into the newly created processing index, and saves the attribute of the user into a memory;

3) a user attribute demodulating and inquiring module is configured for the base station to demodulate the attribute of the user mounted in a processing index by inquiring about the processing index corresponding to the current time point;

specifically, the user attribute demodulating and inquiring module calculates a target index Idx=Sfn % P+P_Offset of a certain attribute at the current time point, wherein Sfn is the current time point, P is the transmission cycle of the certain attribute, P_Offset is the memory address offset of the transmission cycle of the certain attribute; the user attribute demodulating and inquiring module determines a user mounted under the processing index Ue_Offset when the processing index Ue_Offset equals the target index Idx, and the base station demodulates an attribute that the user has which corresponds to the target index Idx.

The key of the disclosure lies in classifying different attributes of a user, creating a corresponding relationship among a transmission cycle, a transmission offset and a processing index, and meanwhile creating a corresponding relationship between time and a processing index, namely, creating a corresponding relationship between a transmission time point and a user attribute to be transmitted. With the technical solution of the disclosure, a target can be hit promptly, the processing time is saved, the processing efficiency is improved, and the processing time delay of the whole link is reduced.

By illustrating the specific embodiments, a more in-depth and detailed understanding of the technical means adopted by the disclosure to achieve expected objective and effect thereof may be obtained. However, the accompanying figures are merely for reference and illustration and are not intended to limit the disclosure.

The invention claimed is:

1. A quick positioning method for multiple cycles and multiple users, comprising: creating, in a base station, a processing index for each attribute of a user, wherein same attributes with same transmission cycles and same transmission offsets share one processing index;

mounting a user into a corresponding processing index according to an attribute of the user, a transmission cycle of the attribute, and a transmission offset of the attribute when the user accesses the base station; and inquiring about a processing index corresponding to current time point, and demodulating, by the base station, the attribute of the user mounted in said processing index.

2. The quick positioning method for multiple cycles and multiple users according to claim 1, wherein the mounting a user into a corresponding processing index according to an attribute of the user, a transmission cycle of the attribute, and a transmission offset of the attribute when the user accesses the base station comprises:

determining whether there exists a corresponding processing index according to an attribute of the user, a transmission cycle of the attribute, and a transmission offset of the attribute; if there exists a corresponding processing index, mounting the user into the existing processing index; otherwise, creating a processing index for the attribute of the user, mounting the user into the created processing index, and saving the attribute of the user into a memory.

3. The quick positioning method for multiple cycles and multiple users according to claim 2, wherein the creating a processing index comprises:

setting the processing index Ue_Offset=Offset% P+P_Offset, wherein P is a transmission cycle of a certain attribute, Offset is a transmission offset of the user under the transmission cycle, P_Offset is a memory address offset of the transmission cycle of the certain attribute.

4. The quick positioning method for multiple cycles and multiple users according to claim 3, further comprising: assuming that specific numerical values of the transmission cycle P of the certain attribute comprise: P1, P2, . . . , Pn, then a memory address offset of a transmission cycle Pn of the certain attribute is: Pn_Offset=P1+P2+ . . . +P(n−1).

5. The quick positioning method for multiple cycles and multiple users according to claim 2, wherein the inquiring about, by the base station, a processing index corresponding to current time point, and demodulating, by the base station, the attribute of the user mounted in said processing index comprises:

calculating a target index Idx=Sfn% P+P_Offset of a certain attribute at current time point, wherein Sfn is the current time point, P is a transmission cycle of the certain attribute, P_Offset is a memory address offset of the transmission cycle of the certain attribute; and determining a mounted user when the processing index equals the target index, and demodulating, by the base station, an attribute that the user has which corresponds to the target index.

6. The quick positioning method for multiple cycles and multiple users according to claim 1, wherein the creating a processing index comprises:

setting the processing index Ue_Offset=Offset% P+P_Offset, wherein P is a transmission cycle of a certain attribute, Offset is a transmission offset of the user under the transmission cycle, P_Offset is a memory address offset of the transmission cycle of the certain attribute.

7. The quick positioning method for multiple cycles and multiple users according to claim 6, further comprising: assuming that specific numerical values of the transmission cycle P of the certain attribute comprise: P1, P2, . . . , Pn, then a memory address offset of a transmission cycle Pn of the certain attribute is: Pn_Offset=P1+P2+ . . . +P(n−1).

8. The quick positioning method for multiple cycles and multiple users according to claim 1, wherein the inquiring about, by the base station, a processing index corresponding to current time point, and demodulating, by the base station, the attribute of the user mounted in said processing index comprises:

calculating a target index Idx=Sfn% P+P_Offset of a certain attribute at current time point, wherein Sfn is the current time point, P is a transmission cycle of the certain attribute, P_Offset is a memory address offset of the transmission cycle of the certain attribute; and determining a mounted user when the processing index equals the target index, and demodulating, by the base station, an attribute that the user has which corresponds to the target index.

9. A quick positioning device for multiple cycles and multiple users, comprising:

a processing index creating module configured to create, in a base station, a processing index for each attribute of a user, wherein same attributes with same transmission cycles and same transmission offsets share one processing index;

a processing index mounting module configured to, when a user accesses the base station, mount the user into a corresponding processing index according to an attribute of the user, a transmission cycle of the attribute, and a transmission offset of the attribute; and a user attribute demodulating and inquiring module configured to inquire about a processing index corresponding to current time point and demodulate the attribute of the user mounted in said processing index.

10. The quick positioning device for multiple cycles and multiple users according to claim 9, wherein the processing index mounting module is further configured to determine whether there exists a corresponding processing index according to an attribute of the user, a transmission cycle of the attribute, and a transmission offset of the attribute; if there exists a corresponding processing index, mount the user into the existing processing index; otherwise, create a new processing index for the attribute of the user, mount the user into the newly created processing index, and save the attribute of the user into a memory.

11. The quick positioning device for multiple cycles and multiple users according to claim 10, wherein the processing index is Ue_Offset=Offset% P+P_Offset, wherein P is a transmission cycle of a certain attribute, Offset is a transmission offset of the user under the transmission cycle, P_Offset is a memory address offset of the transmission cycle of the certain attribute.

12. The quick positioning device for multiple cycles and multiple users according to claim 11, wherein assuming that specific numerical values of the transmission cycle P of the certain attribute comprise: P1, P2, . . . , Pn, then a memory address offset of a transmission cycle Pn of the certain attribute is Pn_Offset=P1+P2+ . . . +P(n−1).

13. The quick positioning device for multiple cycles and multiple users according to claim 10, wherein the user attribute demodulating and inquiring module is further configured to:

calculate a target index Idx=Sfn% P+P_Offset of a certain attribute at current time point, wherein Sfn is the current time point, P is a transmission cycle of the certain attribute, P_Offset is a memory address offset of the transmission cycle of the certain attribute; and determine a mounted user when the processing index equals the target index, and demodulate an attribute that the user has which corresponds to the target index.

14. The quick positioning device for multiple cycles and multiple users according to claim 9, wherein the processing index is Ue_Offset=Offset% P+P_Offset, wherein P is a transmission cycle of a certain attribute, Offset is a transmission offset of the user under the transmission cycle, P_Offset is a memory address offset of the transmission cycle of the certain attribute.

15. The quick positioning device for multiple cycles and multiple users according to claim 14, wherein assuming that specific numerical values of the transmission cycle P of the certain attribute comprise: P1, P2, . . . , Pn, then a memory address offset of a transmission cycle Pn of the certain attribute is Pn_Offset=P1+P2+ . . . +P(n−1).

16. The quick positioning device for multiple cycles and multiple users according to claim 9, wherein the user attribute demodulating and inquiring module is further configured to:

calculate a target index Idx=Sfn% P+P_Offset of a certain attribute at current time point, wherein Sfn is the current time point, P is a transmission cycle of the certain attribute, P_Offset is a memory address offset of the transmission cycle of the certain attribute; and determine a mounted user when the processing index equals the target index, and demodulate an attribute that the user has which corresponds to the target index.

* * * * *